(12) United States Patent
Lee et al.

(10) Patent No.: US 11,189,272 B2
(45) Date of Patent: *Nov. 30, 2021

(54) DIALECT PHONEME ADAPTIVE TRAINING SYSTEM AND METHOD

(71) Applicant: LG ELECTRONICS INC., Seoul (KR)

(72) Inventors: Jee Hye Lee, Seoul (KR); Seon Yeong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 92 days.

This patent is subject to a terminal disclaimer.

(21) Appl. No.: 16/581,076

(22) Filed: Sep. 24, 2019

(65) Prior Publication Data

US 2020/0020320 A1 Jan. 16, 2020

(30) Foreign Application Priority Data

Jun. 18, 2019 (KR) ........................ 10-2019-0072336

(51) Int. Cl.
| | | |
|---|---|---|
| *G10L 15/18* | (2013.01) | |
| *G10L 15/187* | (2013.01) | |
| *G10L 15/065* | (2013.01) | |
| *G10L 15/22* | (2006.01) | |
| *G10L 15/02* | (2006.01) | |

(52) U.S. Cl.
CPC ............ *G10L 15/187* (2013.01); *G10L 15/02* (2013.01); *G10L 15/065* (2013.01); *G10L 15/22* (2013.01); *G10L 2015/025* (2013.01)

(58) Field of Classification Search
CPC ..................................................... G10L 15/18
See application file for complete search history.

(56) References Cited

U.S. PATENT DOCUMENTS

| | | | | |
|---|---|---|---|---|
| 8,583,432 B1 * | 11/2013 | Biadsy | .................... | G10L 15/18 704/235 |
| 8,726,148 B1 * | 5/2014 | Battilana | ............... | G06F 40/274 715/234 |
| 10,474,969 B1 * | 11/2019 | Abdi Taghi Abad | ........................ | G06F 40/247 |
| 2002/0152246 A1 * | 10/2002 | Critchlow | ............... | G06F 40/53 715/262 |

(Continued)

FOREIGN PATENT DOCUMENTS

| | | |
|---|---|---|
| KR | 1020050036303 | 4/2005 |
| KR | 101836430 | 3/2018 |

*Primary Examiner* — Douglas Godbold
(74) *Attorney, Agent, or Firm* — Lee, Hong, Degerman, Kang & Waimey PC

(57) ABSTRACT

Disclosed are a regional dialect phoneme adaptive training method and system. The regional dialect phoneme adaptive training method includes transcription of text data, and generation of a regional dialect corpus based on the text data and regional dialect-containing speech data, and generation of an acoustic model and a language model using the regional dialect corpus. The generation of an acoustic model and a language model may be performed by machine learning of an artificial intelligence (AI) algorithm in which phonemes of a regional dialect item and a frequency of the phonemes of the regional dialect item are extracted and used. A user is able to use a regional dialect speech recognition service which is improved using 5G mobile communication technologies of eMBB, URLLC, or mMTC.

18 Claims, 8 Drawing Sheets

(56) References Cited

U.S. PATENT DOCUMENTS

| | | | |
|---|---|---|---|
| 2002/0188446 A1* | 12/2002 | Gao | G06F 40/216 |
| | | | 704/240 |
| 2003/0083863 A1* | 5/2003 | Ringger | G06F 40/284 |
| | | | 704/10 |
| 2008/0240396 A1* | 10/2008 | Faizakov | G10L 15/18 |
| | | | 379/211.02 |
| 2012/0089397 A1* | 4/2012 | Arai | G06F 40/268 |
| | | | 704/251 |
| 2014/0149104 A1* | 5/2014 | Kim | G10L 15/00 |
| | | | 704/8 |
| 2016/0093294 A1* | 3/2016 | Kapralova | G10L 15/01 |
| | | | 704/232 |
| 2016/0188292 A1* | 6/2016 | Carter | G10L 15/22 |
| | | | 704/257 |
| 2016/0314158 A1* | 10/2016 | Kelly | G06F 16/217 |
| 2017/0061956 A1* | 3/2017 | Sarikaya | G06N 3/006 |
| 2017/0249017 A1* | 8/2017 | Ryu | G06F 3/018 |
| 2018/0005628 A1* | 1/2018 | Xue | G10L 15/063 |
| 2018/0267956 A1* | 9/2018 | Chang | G06F 40/114 |
| 2019/0279613 A1* | 9/2019 | Wheeler | G10L 15/005 |
| 2019/0348023 A1* | 11/2019 | Kwon | G10L 15/16 |
| 2020/0020320 A1* | 1/2020 | Lee | G10L 15/065 |
| 2020/0258497 A1* | 8/2020 | Chen | G06F 40/20 |
| 2020/0394271 A1* | 12/2020 | Bihani | G06F 40/45 |

* cited by examiner

DIALECT PHONEME ADAPTIVE TRAINING SYSTEM AND METHOD

CROSS-REFERENCE TO RELATED APPLICATION

Pursuant to 35 U.S.C. § 119(a), this application claims the benefit of earlier filing date and right of priority to Korean Patent Application No. 10-2019-0072336, filed on Jun. 18, 2019, the contents of which are hereby incorporated by reference herein in its entirety.

BACKGROUND

1. Technical Field

The present disclosure relates to a regional dialect phoneme adaptive training system and method. More particularly, the present disclosure relates to a system and method for selecting regional dialect speech data required for training, semi-automatically refining text, and adaptively training a model using phonemes of regional dialect items.

2. Description of Related Art

The concept of speech recognition includes the recognition, analysis, and understanding of speech uttered by a person during a conversation between the person and a machine, and various techniques have been used for speech recognition.

The speech recognition process is largely composed of three stages. First, from inputted speech, features of speech actually uttered by a person are extracted. Then, based on the extracted features of the speech, patterns are classified through a similarity measurement with a reference acoustic model. Thereafter, within the classified patterns, by using a reference language model, the features of the speech are processed as a language, and recognized as a final sentence.

Dialects of a language generally refer to variations of that language depending on geographical regions and social factors. Regional dialects are a valuable cultural heritage having a unique system and history, showing the diversity of a language. In linguistics, dialects illustrate both the change and the history of a language and the lives of people in the region in which a regional dialect is spoken, which are projected onto the language in terms of cultural values. Moreover, dialects are still used by people in certain geographical regions, along with a standard dialect.

Since a speech recognition system recognizing speech uttered in a particular language is created based on the standard dialect of the corresponding language, the capability to recognize speech in a regional dialect, that is, a regional dialect, is significantly reduced. Since a speech recognition system recognizing speech uttered in a particular language is created on the basis of the standard dialect of that language, the capability to recognize a regional dialect in such a system is significantly reduced.

Korea Patent Application Publication No. 10-2005-0036303 (hereinafter referred to as "Related Art 1") discloses a pseudo morpheme-based multi-pronunciation dictionary construction method for dialogic continuous speech recognition.

However, the method disclosed in Related Art 1 constructs a language model and a vocabulary dictionary by using representative vocabulary alone, thus failing to reflect regional dialects.

Moreover, Korean Patent Registration No. 10-1836430 (hereinafter referred to as "Related Art 2") discloses a technology which, when an utterance in a regional dialect or with a regional accent is inputted, amends the regional dialect to a standard dialect while the tonal noise and phoneme noise associated with the regional dialect are removed, and recognizes the standard dialect.

However, there are cases in which a standard dialect and a regional dialect cannot be distinguished from each other based on their tones alone. According to Related Art 2, the regional dialect does not simply convert to the standard dialect merely by removing the phenome noise from the utterance in a regional dialect or with a regional accent, and therefore, the technology disclosed in Related Art 2 suffers a degradation in recognition performance for both regional and standard dialects.

SUMMARY OF THE INVENTION

One aspect of the present disclosure is to prevent a situation in which speech in a regional dialect is processed in relation to a standard language, by phonologically processing speech in a regional dialect through phoneme adaptive training using a phoneme included in a regional dialect item.

Another aspect of the present disclosure is to address the shortcoming in some of the related art in which word spacing is determined based on a standard regional dialect corpus to recognize regional dialect speech.

Another aspect of the present disclosure is to address the shortcoming in some of the related art in which, rather than recognizing regional dialect speech as is, the regional dialect speech is converted to standard dialect speech, thus failing to be accurate in distinguishing regional dialect speech and standard dialect speech.

Another aspect of the present disclosure is to address the shortcoming in some of the related art in which a person is required to perform manual transcription for speech data processing, consuming much time and expense.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Therefore, the scope of the disclosure is defined not by the detailed description, but by the claims and their equivalents, and all variations within the scope of the claims and their equivalents are to be construed as being included in the disclosure.

A regional dialect phoneme adaptive training method according to an embodiment of the present disclosure is performed by a regional dialect phoneme adaptive training system.

The regional dialect phoneme adaptive training method according to an embodiment of the present disclosure may include: transcribing text data by sorting regional dialect-containing speech data from collected speech data; generating a regional dialect corpus using the text data and the regional dialect-containing speech data; and generating an acoustic model and a language model using the regional dialect corpus. The generating an acoustic model and a language model may include extracting phonemes of a regional dialect item and a frequency of the phonemes of the regional dialect item, and training a phoneme adaptive model based on the extracted phonemes and the extracted frequency.

The regional dialect phoneme adaptive training method may further include collecting speech data through a speech recognition service domain.

In the collecting speech data, speech data of users using different regional dialects may be collected through a speech input/output interface of various electronic devices by region.

The transcribing text data may include removing an abnormal vocalization from the collected speech data, selecting regional dialect-containing speech data using a reliability measurement of the speech data, and obtaining transcription data from the regional dialect-containing speech data.

The generating a regional dialect corpus may include extracting a feature from the regional dialect-containing speech data, performing clustering of similar regional dialect items in the regional dialect-containing speech data using the extracted feature, extracting a core regional dialect item from a similar regional dialect item cluster, and standardizing a regional dialect corpus using the extracted core regional dialect item. In addition, in the generating an acoustic model and a language model, phonemes of a core regional dialect item and a frequency of the phonemes of the core regional dialect item may be extracted, and a phoneme adaptive model may be trained based on the extracted phonemes and the extracted frequency.

In the extracting a feature from the regional dialect-containing speech data, at least one among pronunciation string features, lexical features, domain features, and frequency features of a regional dialect item may be extracted.

The domain features may include information on a type of an electronic apparatus providing a speech recognition service for the user, information on a region in which the electronic apparatus is located, and information on an age group of the user of the electronic apparatus.

In the performing clustering of similar regional dialect items, a degree of similarity between features may be measured through a weight calculation between features according to an unsupervised learning method, and regional dialect items with a degree of similarity higher than a threshold may be clustered.

In the extracting a core regional dialect from the similar regional dialect cluster, N number of objects having the highest frequency features in a cluster may be extracted, and a core object may be extracted through a feature similarity calculation with other objects in the cluster.

In the standardizing a regional dialect corpus, an existing regional dialect item may be replaced with a core object dialect item, and verification may be performed through a similarity measurement between an original regional dialect sentence and a replaced sentence.

A regional dialect phoneme adaptive training system according to another embodiment of the present disclosure includes a data transcription module transcribing text data from regional dialect-containing speech data of collected speech data, a corpus generation module generating a regional dialect corpus using the text data and the regional dialect-containing speech data, an acoustic model generation module and a language model generation module generating an acoustic model and a language model, respectively, using the regional dialect corpus, and a speech recognition engine recognizing speech using the trained acoustic model and the trained language model. The acoustic model generation module may extract phonemes of a regional dialect item and a frequency of the phonemes of the regional dialect item, and may train a phoneme adaptive model based on the extracted phonemes and the extracted frequency.

The acoustic model generation module may include a first module extracting phonemes of a regional dialect item from regional dialect-containing speech data, a second module extracting a frequency of the phonemes of the regional dialect item, and a third module training a phoneme adaptive model using the extracted phonemes and the extracted frequency.

The regional dialect phoneme adaptive training system may further include a data collection module collecting speech data of users using different regional dialects through speech input/output interfaces of various electronic devices.

The data transcription module may remove an abnormal vocalization from collected speech data, select regional dialect-containing speech data using a reliability measurement of the speech data, and generate transcription data from the regional dialect-containing speech data.

The corpus generation module may include a feature extraction module extracting a feature from the regional dialect-containing speech data, a deep learning module performing clustering of similar regional dialect items in the regional dialect-containing speech data using the extracted feature, a core regional dialect item extraction module extracting a core regional dialect item from a similar regional dialect item cluster, and a corpus standardization module standardizing a regional dialect corpus using the extracted core regional dialect item.

The feature extraction module may extract at least one among pronunciation string features, lexical features, domain features, and frequency features of a regional dialect item.

The domain features may include information on a type of an electronic apparatus providing a speech recognition service for the user, information on a region in which the electronic apparatus is located, and information on an age group of the use of the electronic apparatus.

The deep learning module may measure a degree of similarity between features through a weight calculation between the features according to an unsupervised learning method, and may cluster regional dialect items having a degree of similarity higher than a threshold.

The core regional dialect item extraction module may extract N number of objects having the highest frequency features in a cluster, and may extract a core object through a feature similarity calculation with other objects in the cluster.

The corpus standardization module may replace an existing regional dialect item with a core regional dialect item, and may perform verification through a similarity measurement between an original regional dialect sentence and a replaced sentence.

According to embodiments of the present disclosure, by phonologically processing regional dialect speech through phoneme adaptive training using phonemes included in regional dialect items, a recognition rate of the regional dialect speech may be improved.

In addition, by enabling regional dialect-containing speech to be recognized as it is, without conversion into a standard dialect, natural language processing of language using a regional dialect may be performed.

In addition, by using artificial intelligence for data mining, data refining may be performed using a semi-automatic method.

In addition, through standardization of a corpus including regional dialect speech, the time consumed in dialect speech recognition may be reduced.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

DETAILED DESCRIPTION

Figure 1:
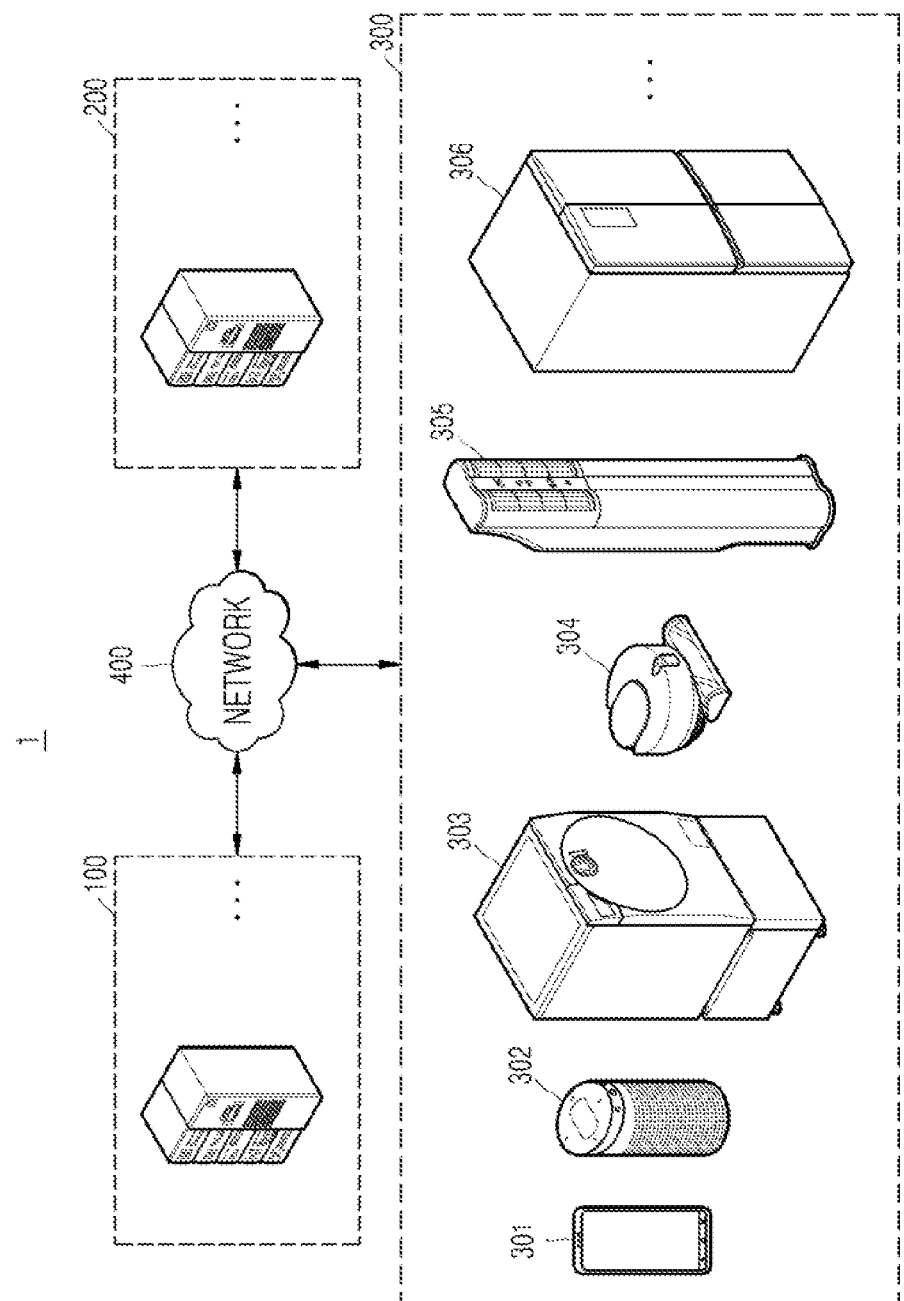
FIG. 1 is a view illustrating a network environment including a regional dialect phoneme adaptive training system according to an embodiment of the present disclosure.

Advantages and features of the present disclosure and methods for achieving them will become apparent from the descriptions of aspects herein below with reference to the accompanying drawings. However, the present disclosure is not limited to the aspects disclosed herein but may be implemented in various different forms. The aspects are provided to make the description of the present disclosure thorough and to fully convey the scope of the present disclosure to those skilled in the art. It is to be noted that the scope of the present disclosure is defined only by the claims.

The shapes, sizes, ratios, angles, the number of elements given in the drawings are merely exemplary, and thus, the present disclosure is not limited to the illustrated details. Like reference numerals designate like elements throughout the specification.

In relation to describing the present disclosure, when the detailed description of the relevant known technology is determined to unnecessarily obscure the gist of the present disclosure, the detailed description may be omitted.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The terms "connected" and "coupled" are not restricted to physical or mechanical connections or couplings, and can include electrical connections or couplings, whether direct or indirect. The connection can be such that the objects are permanently connected or releasably connected. The term "communicatively coupled" is defined as connected, either directly or indirectly through intervening components, and the connections are not necessarily limited to physical connections, but are connections that accommodate the transfer of data, fluids, or other matter between the so-described components.

An intelligent virtual assistant is a software agent processing a task requested by a user like a personal assistant, and providing a user-specific service. Recent intelligent virtual assistants provide customized information to a user based on artificial intelligence engines and speech recognition, and perform various functions such as schedule management, e-mail transmission, and restaurant reservation, depending on a speech command of the user.

The types of services provided by intelligent virtual assistants implemented as a so-called smart speaker include controlling an electronic device, providing information such as weather, and chatting, but the range of the services is gradually widening.

Among various speech recognition-related services provided by the smart speaker, services related to elderly people living alone have grown in importance. A smart speaker may be used as a device for managing the health and welfare of a growing number of elderly people living alone. Through conversation and monitoring functions, a smart speaker can sometimes act as a welfare officer, sometimes as a counselor, and sometimes as emergency and/or first aid guidance. However, since dialects with strong regional characteristics are widely used by elderly people living alone, it may be difficult to recognize a state of the elderly people living alone through speech recognition using a smart speaker.

Among dialects used in South Korea, the regional dialects of Gyeongsang Province and Jeolla Province have come to be the most significant. Moreover, among the dialects, the frequency of use of a spoken language dialect in communication between interlocutors increases in proportion to age. The present disclosure relates to a regional dialect phoneme adaptive training system and method for regional dialect speech recognition in a speech recognition service provided through an input/output interface for speech recognition, which may be implemented in the form of a module in various electronic devices such as, for example, a user terminal or a smart speaker.

FIG. 1 is a view of a network environment 1 including a regional dialect phoneme adaptive training system according to an embodiment of the present disclosure.

Referring to FIG. 1, a speech recognition system 100 and a regional dialect phoneme adaptive training system 200 for constructing the same according to an embodiment of the present disclosure, various smart electronic devices 300 controlled through a speech interface, and a network 400 which enables communication between the smart electronic devices 300 by connecting these to each other, are illustrated.

The speech recognition system 100 is a system performing a complex function such as recognition of various types of speech and output of a processing result in the form of words and characters through natural language processing based on the recognized speech.

The speech recognition system 100 may provide a speech recognition service for a smart electronic device 300 through various speech recognition service domains. Here, the speech recognition service is not limited to recognizing a speech of a person, but may include an artificial intelligent assistant function through natural language processing and an electronic device control service through a speech interface.

The speech recognition system 100 may be configured to perform an entire process of speech processing, including speech recognition, natural language understanding, natural language generation, and speech synthesis. The speech recognition system 100 may be configured in the form of a single server such as a computing device, or may be configured as one or more servers with respect to each of speech recognition, natural language understanding, natural language generation, and speech synthesis.

The regional dialect phoneme adaptive training system 200 is a system for processing regional dialect-containing data, and training a model required for regional dialect speech recognition using the processed data.

The regional dialect phoneme adaptive training system 200 may collect speech of the user through a corresponding domain, for example, regional dialect-containing speech data. That is, the regional dialect phoneme adaptive training system 200 may collect speech data through user log data. In addition, the regional dialect-containing speech data collected from each domain (that is, dialect data) may be used as training data, which enables training of an acoustic model and a language model. In particular, various types of information on a corresponding domain, and region information of the electronic device 300, may be used to guide classifying regional dialect data by region.

The regional dialect phoneme adaptive training system 200 may collect dialect speech data having features which differ by domain or region. Through a network access address of the smart electronic device 300 transmitting dialect speech data to a server of the speech recognition system 100, or through hardware information, a region in which the corresponding smart electronic device 300 is located may be identified. Thus, pieces of dialect speech data of different regions, such as Gyeonggi Province, Jeolla Province, Gyeongsang Province, Chungcheong Province, Gangwon Province, and Jeju Island, are sorted by region and collected. Hereinafter, the regional dialect phoneme adaptive training system 200 according to an embodiment of the present disclosure will be described in detail.

The electronic device 300 includes a speech input/output interface, and may be configured to include an embedded system enabling communication via Internet of Things (IoT). As an example of the electronic device 300, various IoT-enabled electronic devices 300 may be provided, such as a user terminal 301 performing an artificial intelligent assistant function, an artificial intelligent speaker 302 serving as a hub for connecting other electronic devices 300 to the network 400, a robot cleaner 304, an air conditioner 305, and a refrigerator 306. However, examples of the electronic device 300 are not limited to those illustrated in FIG. 1.

The electronic device 300 may be connected to the speech recognition system 100 through a corresponding domain, and thereby use a speech recognition service. The representative speech recognition service, provided through the user terminal 301, is an artificial intelligent assistant function by an application. The artificial intelligent speaker 302, as a speaker having an agent function using an artificial intelligence (AI) algorithm, may serve as a hub controlling an electronic device without a speech input/output function.

Apart from the above electronic devices, a voice input/output function is accommodated other electronic devices, such as household electrical appliances 303 to 306, so that the user can control electronic products using a voice interface. In this regard, the electronic devices 300 are referred to as smart electronic devices.

The network 400 may be a wired or wireless network, for example, a local area network (LAN), a wide area network (WAN), the Internet, and intranet and extranet, a mobile network, for example, cellular, 3G, 4G LTE, and 5G, a Wi-Fi network, and an ad-hoc network, and any suitable communications network including combinations thereof.

The network 400 may include connection of network elements such as hubs, bridges, routers, switches, and gateways. The network 400 may include one or more connected networks, including a public network such as Internet and a private network such as a secure corporate private network, for example, a multiple network environment. Access to the network 400 may be provided via one or more wired or wireless access networks.

Various smart electronic devices 300 may transmit and receive data with the regional dialect phoneme adaptive training system 200 through a 5G network. In detail, the smart electronic device 300 may perform data communications with the regional dialect phoneme adaptive training system 200 using at least one among an enhanced mobile broadband (eMBB), ultra-reliable and low latency communications (URLLC), and massive machine-type communications (mMTC) through a 5G network.

eMBB is a mobile broadband service, and provides, for example, multimedia contents and wireless data access. In addition, improved mobile services such as hotspots and broadband coverage for accommodating the rapidly growing mobile traffic may be provided via eMBB. Through a hotspot, the large-volume traffic may be accommodated in an area where user mobility is low and user density is high. Through broadband coverage, a wide-range and stable wireless environment and user mobility may be guaranteed.

The URLLC service defines the requirements that are far more stringent than existing LTE in terms of reliability and transmission delay of data transmission and reception, and corresponds to a 5G service for production process automation in the industrial field, telemedicine, remote surgery, transportation, safety, and the like.

mMTC is a transmission delay-insensitive service that requires a relatively small amount of data transmission. A much larger number of terminals, such as sensors, than a general portable phone may be connected to a wireless access network by mMTC at the same time. In this case, the communication module price of the terminal should be inexpensive, and there is a need for improved power efficiency and power saving technology capable of operating for years without battery replacement or recharging.

Figure 2:
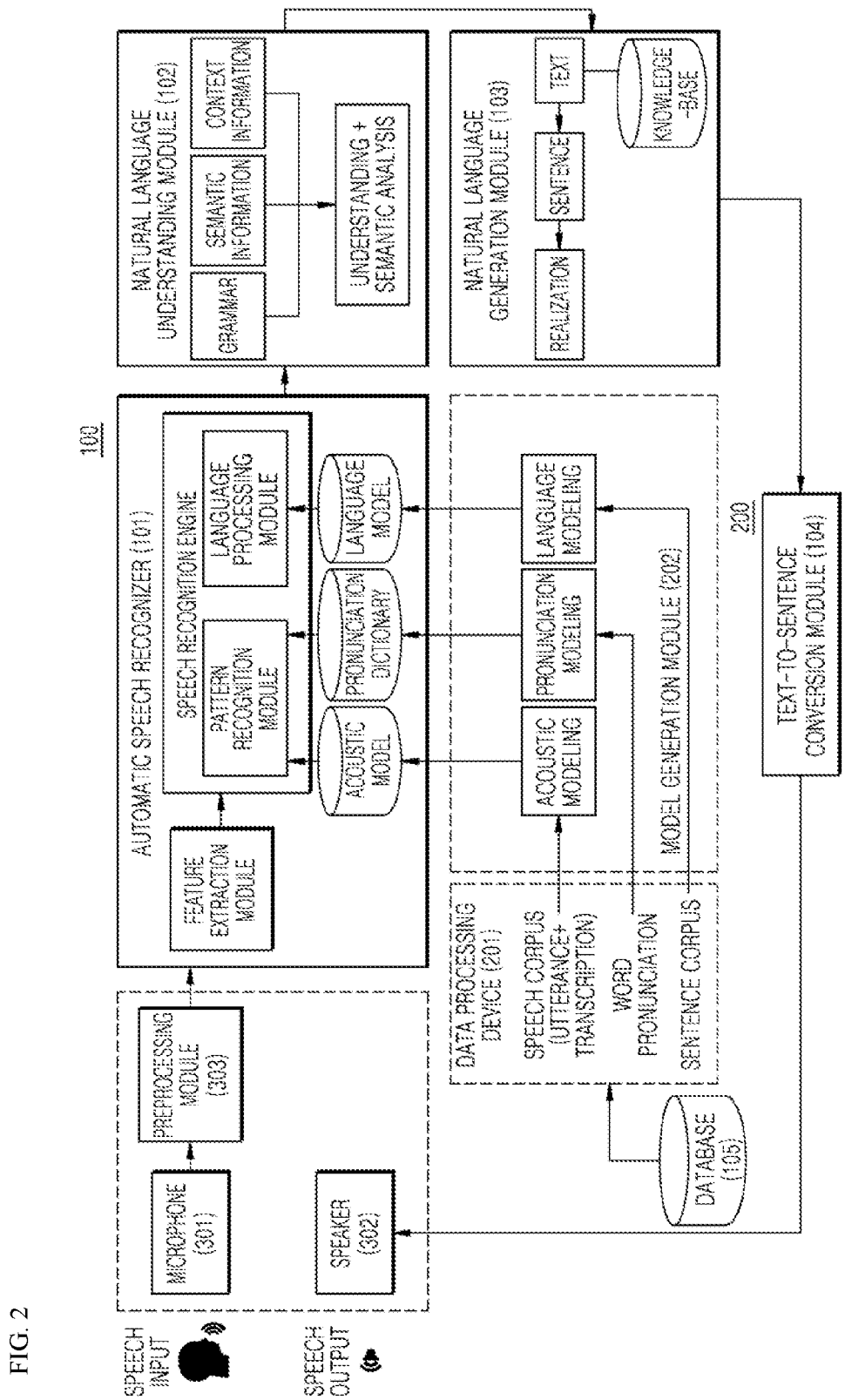
FIG. 2 is a schematic block diagram illustrating a relationship between a speech recognition system and a regional dialect phoneme adaptive training system.

FIG. 2 is a schematic block diagram illustrating a relationship between a speech recognition system and a regional dialect phoneme adaptive training system.

Referring to FIG. 2, components of a speech recognition system 100 and a regional dialect phoneme adaptive training system 200 are illustrated.

The speech recognition system 100 recognizes speech using a preprocessed speech signal, inputted through a microphone 301 included in an electronic device 300, understands the contents of the speech based on recognized text, generates natural language based on the understood contents, and synthesizes speech, which can be outputted through a speaker 302, using generated text.

The speech recognition system 100 may be configured to include modules respectively performing a series of processes from input to output of speech, and the modules may include an automatic speech recognizer (ASR) 101, a natural language understanding (NLU) module 102, a natural language generation (NLG) module 103, and a text-to-sentence conversion (TTS) module 104. Here, components constituting the speech recognition system 100 may be provided as one server, or each component may be provided as one or more servers.

Referring again to FIG. 2, while speech recognition processes are performed by the ASR module 101 to the TTS module 104 in an online stage, various model training processes, required for data collection, processing, and a speech recognition using the same, are performed by the data processing device 201 and the model generation module 202 in an offline stage.

The regional dialect phoneme adaptive training system 200 according to an embodiment of the present disclosure may be configured to include a data processing device 201 and a model generation module 202. The data processing device 201 collects, sorts, and processes data to generate a speech corpus, information on word pronunciation, and a sentence corpus. Moreover, the model generation module 202 performs acoustic modeling, pronunciation modeling, and language modeling using the information described above, and each of a phoneme adaptive model, a pronunciation dictionary, and a language model is generated as a result of performance. Here, the phoneme adaptive model, the pronunciation dictionary, and the language model become a standard of determination necessary for speech recognition of a speech recognition engine. That is, as a larger amount of data is used for training, a recognition rate of the ASR module 101 can be increased.

Figure 3:
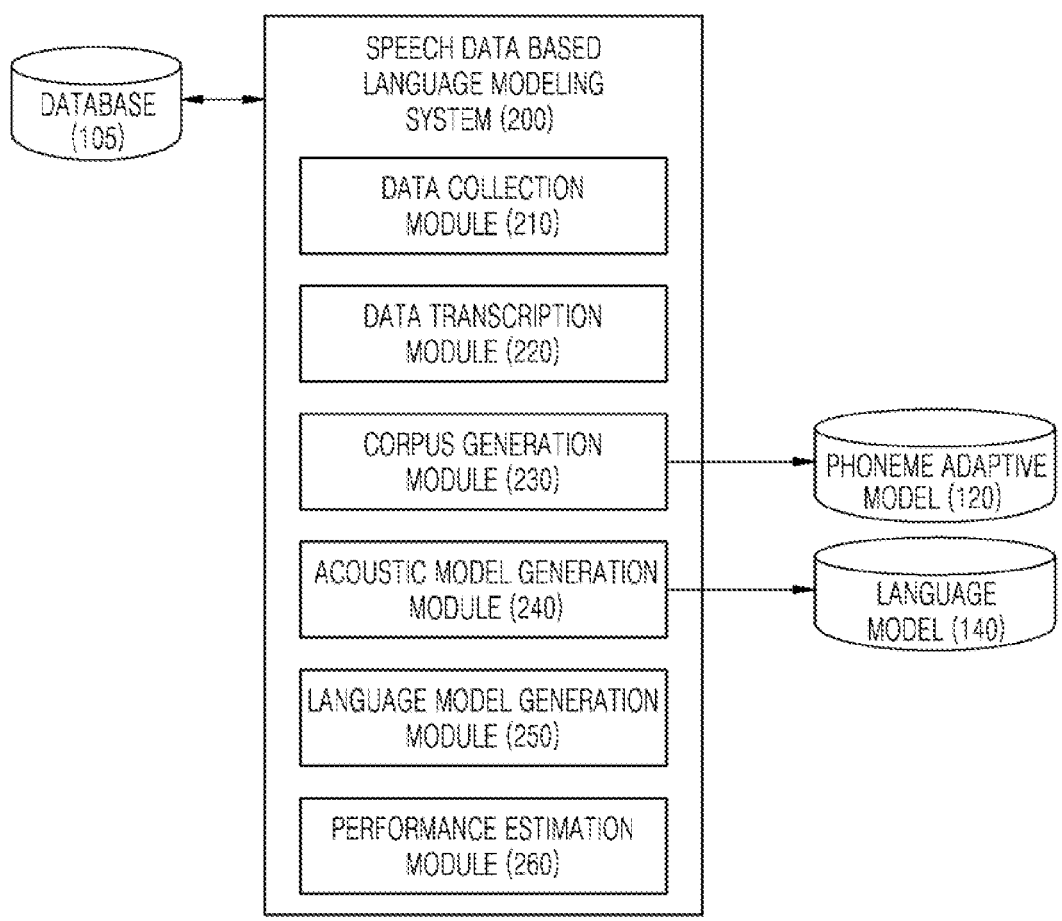
FIG. 3 is a block diagram illustrating a configuration of a regional dialect phoneme adaptive training system according to an embodiment of the present disclosure.

FIG. 3 is a block diagram illustrating a configuration of a regional dialect phoneme adaptive training system according to an embodiment of the present disclosure.

Referring to FIG. 3, a regional dialect phoneme adaptive training system 200 may be configured to include a data collection module 210, a data transcription module 220, a corpus generation module 230, an acoustic model generation module 240, a language model generation module 250, and a performance estimation module 260. The entirety of respective components may be implemented as one server, or each component may be implemented as one or more servers.

The data collection module 210 may collect regional dialect data from the voice database 105. Dialects of respective regions, inputted through the smart electronic device 300 of FIG. 1, are classified according to domain and regional group, collected by the data collection module 210, and stored in the database 105.

The data transcription module 220 selects data from the database 105 stored in the regional dialect phoneme adaptive training system 200, and uses a voice recognition result and information such as a lattice. The data transcription module 220 selects data from the collected data using an abnormal vocalization classifier, excluding data which cannot be used for learning, such as sounds other than speech, speech between multiple speakers, and misrecognized speech.

The selected speech data may be transcribed through auto-transcription or manual transcription. In the case of auto-transcription, a degree of reliability is measured for an auto-transcription result in order to prevent possible errors from occurring, and data may be classified according to the degree of reliability.

In this case, data with a high degree of reliability and data with a low degree of reliability may be provided. The data with a high degree of reliability may include dialect data. Thus, data with a low degree of reliability may be selected from the collected data, and through accent analysis, regional dialect-containing speech data may be selected. Through the accent analysis, data other than regional dialect speech in the data with a low degree of reliability, such as slang, shortened words, and the like, may be removed. Transcription data is extracted from the selected dialect data and is then stored.

The corpus generation module 230 is a module for processing raw data in order to generate training data, which enables training of an acoustic model and a language model.

Figure 4:
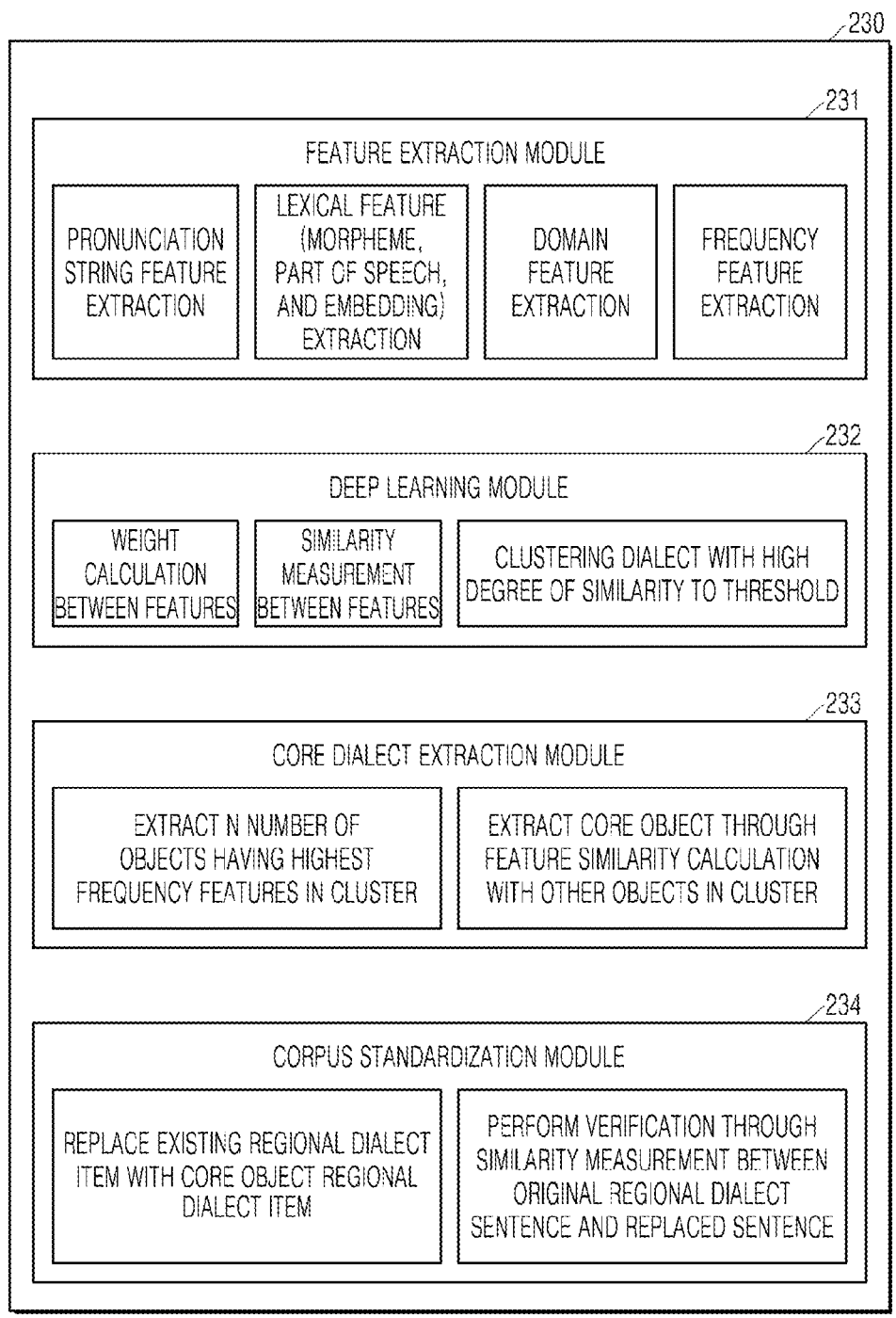
FIG. 4 is a block diagram illustrating a component of a corpus generation module, which is one component of a regional dialect phoneme adaptive training system.

FIG. 4 is a block diagram illustrating a component of a corpus generation module, which is one component of a regional dialect phoneme adaptive training system.

Referring to FIG. 4, components of a corpus generation module according to an embodiment of the present disclosure are illustrated.

The corpus generation module 230 may be configured to include a feature extraction module 231, a deep learning module 232, a core regional dialect item extraction module 233, and a corpus standardization module 234.

The feature extraction module 231 may extract at least one feature among pronunciation string features, lexical features (that is, morpheme, part of speech, and embedding features), domain features, and frequency features of speech data, particularly, regional dialect speech data. Here, the pronunciation string features and the lexical features correspond to linguistic features of a regional dialect item.

The domain features correspond to features external to language, related to generation of regional dialect speech. As described with reference to FIG. 1, regional dialect speech is collected through a speech recognition service domain, and is analyzed and refined. The domain features may include information on an electronic device 300 through which the corresponding speech recognition service is provided, information on a region in which the electronic device 300 is distributed, and information on an age group of the user of the electronic device 300. Thus, through the domain features, speech data may be classified, according to the regional dialect used in a corresponding region.

The deep learning module 232 calculates the weight between features, measures a degree of similarity between features, and performs clustering of regional dialect items having a degree of similarity higher than a threshold.

The core regional dialect item extraction module 233 extracts N number of regional dialect items having the highest frequency features in a cluster, and extracts a core object through a feature similarity calculation with other objects in the cluster.

The corpus standardization module 234 replaces an existing regional dialect item with a core object regional dialect item, and verifies a standardization operation through a similarity measurement between an original dialect sentence and a replaced sentence.

In the case of a regional dialect of a region, for example, Gyeongsang Province or Jeolla Province, dialect items which due to variation have various forms but have the same meaning may be derived from a single dialect item. In this case, similar dialect items should be classified together. Classification of similar dialect items having the same meaning is referred to as clustering.

A core regional dialect item is extracted from a group in which dialect items in various forms but having the same meaning are clustered, and the core regional dialect item is used to standardize a corpus of dialect items.

The acoustic model generation module 240 performs statistical or pattern classification of acoustic characteristics according to phoneme pronunciation to generate an acoustic model modeled as thousands to tens of thousands of models. In detail, the acoustic model generation module 240 generates an acoustic model, and trains an acoustic model using a corpus composed of regional dialect-containing transcription data and regional dialect-containing refined speech data.

The acoustic model generation module 240 according to an embodiment of the present disclosure may be configured to include a first module extracting phonemes of a regional dialect item from a corpus, a second module extracting a frequency of the extracted phonemes of the regional dialect item, and a third module setting a weight depending on the extracted frequency of the phonemes of the regional dialect item, and using the result of the weight setting to train a phoneme adaptive model.

Moreover, when there is a dialect item corresponding to a core object in a group clustered from a standardized corpus, only the selected core object is applied to phoneme adaptive model training. In this case, a standardized dialect text is applied to training of a language model.

The language model generation module 250 generates a language model in which a grammar system of a language is statistically modeled from text data of tens to hundreds of millions of words. In detail, the language model generation module 250 generates a language model, and trains the language model regional dialect-containing transcription data.

Moreover, when there is a dialect item corresponding to a core object in a group clustered from a standardized corpus, a regional dialect text of the selected core object is applied to language model training.

Moreover, the language model generation module 250 trains a language model using speech data on word spacing of collected regional dialect speech from actual user log data, in order to increase a recognition rate of regional dialect speech. Through training in which actually uttered speech is segmented into word-phrases, and a weight, that is, a frequency, is applied to the segmented word-phrases, a language model according to an embodiment of the present disclosure may be generated.

Figure 5:
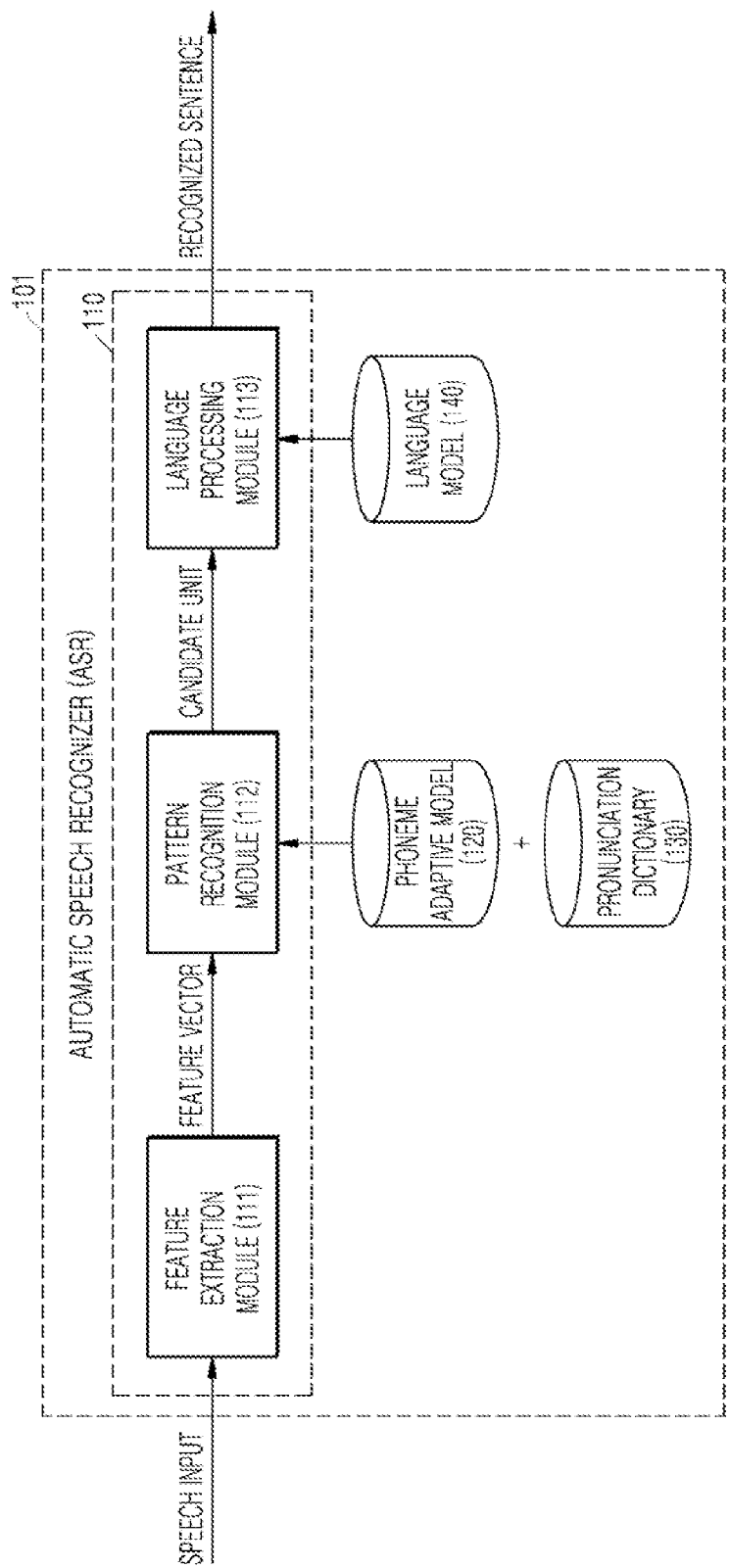
FIG. 5 is a schematic block diagram of a speech recognition process by automatic speech recognition.

FIG. 5 is a schematic block diagram of a speech recognition process by an ASR.

FIG. 5 illustrates an ASR 101 according to an embodiment of the present disclosure. The ASR module 101 may be configured to include a speech recognition engine 110, a phoneme adaptive model 120, a pronunciation dictionary 130, and a language model 140.

Uttered speech is converted into an analog signal through a microphone, and then the analog signal is converted into a digital signal through a digital sampling process. The digital signal is subjected to acoustic signal processing. Here, the acoustic signal processing may include spectral analysis.

Regional dialect speech is inputted through the smart electronic device 300 (for example, an AI speaker 302) and the inputted speech is converted into an analog signal, and the converted analog signal is converted into a digital signal through sampling. The speech recognition engine 110 extracts features of the speech, that is, a feature vector, from the digital signal. Thereafter, the speech recognition engine 110 generates a candidate unit through a pattern recognition process using the phoneme adaptive model 120 and the pronunciation dictionary 130 based on the extracted feature vector, and outputs a sentence that is finally recognized through a language processing process using the pronunciation dictionary 130 and the language model 140.

The ASR module 101 recognizes elements of a sentence, such as phonemes, syllables, and words based on features of a speech signal, expressed as a simple number, by way of example, in a pattern recognition process. In addition, the ASR module 101 reconstructs the elements of a sentence to restore a sentence in a language processing process, which is a post-processing process. In the pattern recognition process, theoretical knowledge of phonetics, phonology, phonotactics, and prosody may be used. Meanwhile, in the language processing process (the post-processing process), theoretical knowledge of syntax, semantics, and morphology may be used.

Even in the same language, speech not only varies in significantly complicated ways depending on factors such as the gender, age, and state during pronunciation of the person uttering the speech, but the character of the speech also varies depending on whether the speech is uttered alone or within a word or a sentence. Thus, it is important to detect the features capable of successfully representing the features of the speech. That is, in the process of extracting the features, unnecessarily duplicated speech information should be removed, whereas information that increases consistency in the same speech signals while increasing distinguishability with respect to other speech signals should be extracted. Such information is called a feature vector.

Feature extraction is a process of extracting components useful for recognition from a speech signal. The feature extraction generally relates to data compression and dimensionality reduction processes. Since there is no ideal answer for feature extraction, a speech recognition rate is used to determine the degree of quality of the features for speech recognition. The main research fields regarding feature extraction are an expression of a feature reflecting a human auditory feature, an extraction of a feature robust to various noise environments/speakers/channel changes, and an extraction of a feature expressing a change of time.

Feature extraction techniques of input speech, required for speech recognition, are a linear predictive coefficient, cepstrum, a mel-frequency cepstral coefficient (MFCC), and a filter bank energy.

In the speech recognition phase, a pattern recognition algorithm has been actively studied. As types of pattern recognition algorithms, dynamic time warping (DTW), hidden Markov modeling (HMM), knowledge base systems, and artificial neural networks are provided. Here, the DTW uses dynamic programming, the HMM uses a probability estimation, the knowledge based systems use an inference using an artificial intelligence, and the artificial neural networks use a function of pattern recognition, to solve the same problem using different methods.

The regional dialect phoneme adaptive training system 200 according to an embodiment of the present disclosure may recognize a pattern of speech by applying deep learning, a type of artificial intelligence algorithm, in a speech recognition operation. For example, in an artificial neural network in which a Gaussian mixture model (GMM) used for modeling each state probability distribution of HMM is replaced with a deep neural network (DNN), a method in which DNN and HMM are combined with each other may be used.

In speech recognition using DNN-HMM, DNN is applied to calculate state probability from a speech feature vector. Input of DNN is provided as a speech feature vector of about ten frames, while output of DNN is provided as respective state probabilities of all triphones used as a unit in HMM. According to a model parameter for each layer of DNN trained by inputting a feature vector string, obtained from the about ten frames, a state probability value of a triphone is obtained in a final output. By using the state probability value, a recognition result of the registered lexical unit is searched.

In an image recognition field, a convolutional neural network has excellent performance. However, in a time series data field, the convolutional neural network faces difficulties. In the time series data field, such as in speech recognition, language translation, and natural language processing, a recurrent neural network (RNN) may be used. In the case of a recurrent neural network, a sequence having an arbitrary length may be processed, rather than fixed length input.

The recurrent neural network has a structure in which output is returned to save a state of a hidden layer, rather than a structure in which output is returned to input as is the case in an associative memory. The meaning of "recurrent" refers to repetition, and the recurrent neural network has a structure in which a specific part is repeated. Compared with a neural network according to the related art, in the recurrent neural network, a hidden layer neuron includes a recurrent weight, returning to itself. The recurrent weight has a function of remembering information on past data, so the recurrent neural network may use a past memory when new data is processed.

A performance estimation module 260 may estimate a regional dialect speech recognition performance through a reliability measurement of a speech recognition result, performed by a speech recognition engine 110 using the trained phoneme adaptive model 120 and the trained language model 140. In addition, the performance estimation module 260 compares a previous automatic speech recognition with a new automatic speech recognition in which a degree of reliability is estimated. When it is determined that a speech recognition function is improved by a new phoneme adaptive model 120 and a new language model 140, an acoustic model 120 and a language model 140 of the ASR 101 is updated to include newly trained contents.

Language processing algorithms include syntactic rule models and statistical models. A syntactic rule method is a method in which a sentence is constituted by restricting a type of word which follows each word according to a syntactic rule. Meanwhile, in a statistical model, represented by an N-gram, a sentence is recognized in consideration of the probability of occurrence of the N number of previous words with respect to each word.

The speech recognition process is divided into an offline training stage in which a recognition network model is generated from speech data and language data and an online search stage in which speech uttered by the user is recognized.

The speech recognition engine 110 outputs character information from a speech signal using important knowledge of phonetic and linguistic information, that is, an acoustic model and a language model, and additionally a pronunciation dictionary. In this case, a speech recognition algorithm may be referred to as a decoder, in that a speech signal is interpreted as character symbols.

The feature vector, obtained in the feature extraction, is subjected to a similarity measurement and a recognition process. For similarity measurement and recognition, an acoustic model for modeling and comparing signal characteristics of speech is used. In detail, the acoustic model used therefor includes a phoneme adaptive model 120 for adaption to phonemes of regional dialect speech and a language model 140 modeling a linguistic order relation of words or syllables, corresponding to a recognition vocabulary.

The acoustic model is again divided into a direct comparison method and a statistical method. In the direct comparison method, a recognition target is set as a feature vector model, and the feature vector model is compared with a feature vector of an input signal. In the statistical method, feature vectors of a recognition target are statistically processed and used. In the direct comparison method, a unit such as a word or a phoneme, provided as a recognition target, is set as a feature vector model, and inputted speech is compared with the feature vector model to obtain a degree of similarity therebetween. The representative direct comparison method is a method using vector quantization. Here, the previously obtained feature vector or coefficients are mapped to a codebook, which is an existing model, and encoded into a representative value, and code values are thereby compared with each other.

In the statistical method, a unit for a recognition target is provided as a state sequence, and the relationship between state sequences is used. The state sequence can construct a complex model, and thus this technique is used for most speech recognition, excluding simple word recognition. The method using the relationship between state sequences is again divided into a method using a temporal arrangement relationship such as dynamic time warping (DTW), a statistical method such as hidden Markov modeling (HMM) in which the probability, mean, and variance are provided as comparison targets, and a method using an artificial neural network.

In the decoding, by using the acoustic model (AM) 120, the language model (LM) 140, and the pronunciation dictionary 130, resulting from the training stage, the inputted feature vector is compared with a model and scored, and a word sequence is ultimately determined.

The database 105 may be configured to include user log data including regional dialect speech data, collected by various smart electronic devices 300 through a domain providing the speech recognition service illustrated in FIG. 1, and public speech data collected by national institutions or research institutes. In addition, the database 105 may be configured to include big data.

Hereinafter, a regional dialect phoneme adaptive training method performed by the regional dialect phoneme adaptive training system 200, in particular, a process of generating and training an acoustic model and a language model, corresponding to an off-line stage, will be described in detail.

Figure 6:
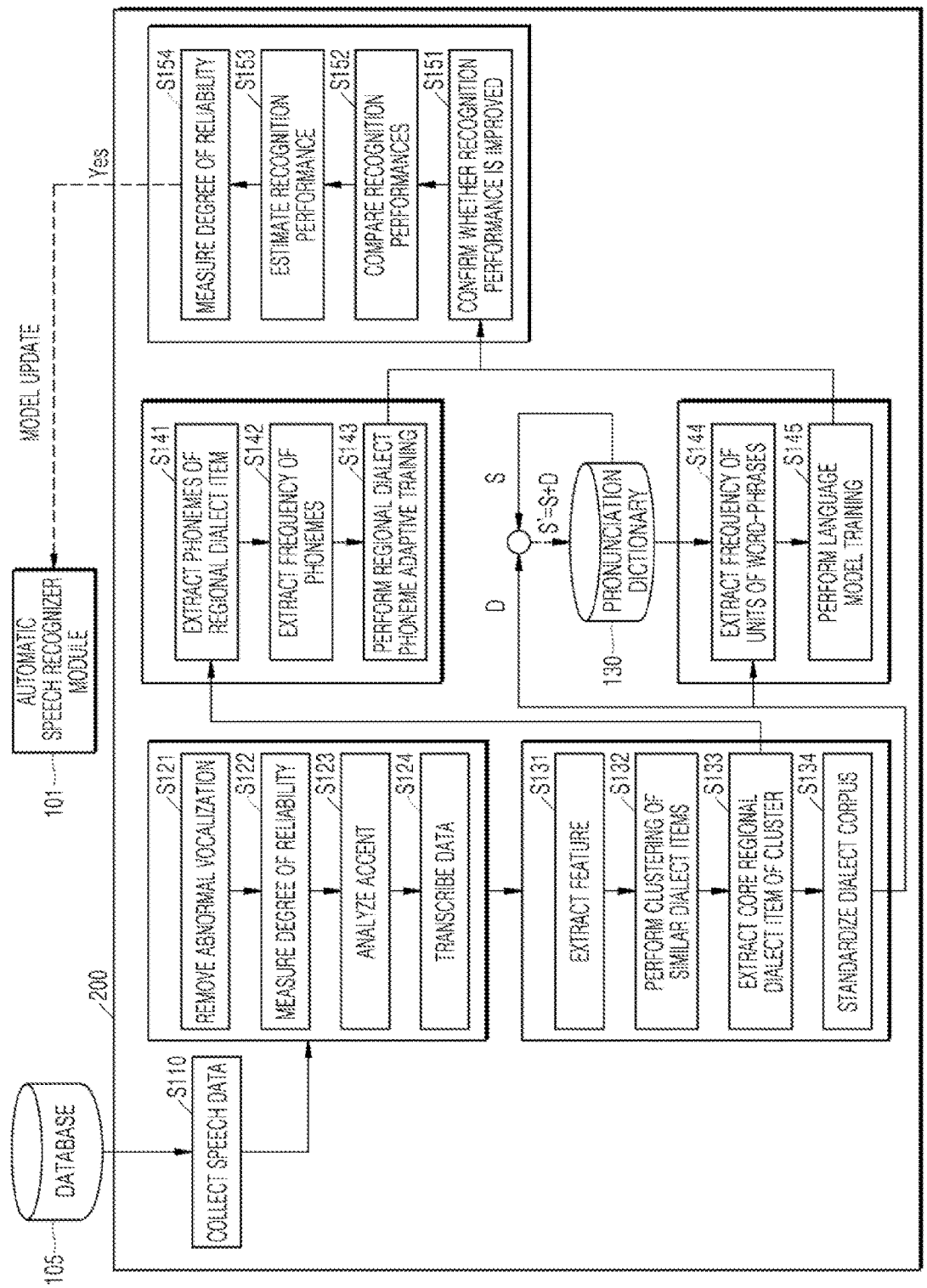
FIG. 6 is a flow diagram of a regional dialect phoneme adaptive training method according to an embodiment of the present disclosure.

FIG. 6 is a flow diagram of a regional dialect phoneme adaptive training method according to an embodiment of the present disclosure.

Referring to FIG. 6, a regional dialect phoneme adaptive training method S100 according to an embodiment of the present disclosure includes collecting speech data (S110), processing data for configuration of an ASR module 101 suitable for dialect speech recognition (S121 to S134), and recognizing uttered speech using the ASR module 101.

In the regional dialect phoneme adaptive training method (S100) according to an embodiment of the present disclosure, processing data for configuring an ASR module 101 includes, as a main process, updating an acoustic model and a language model required for dialect speech recognition.

A regional dialect phoneme adaptive training system 200 according to an embodiment of the present disclosure performs the following operations in order to improve a regional dialect speech recognition performance.

First, the regional dialect phoneme adaptive training system 200 collects data through a data collection module 210 (S110). The data collection module 210 may be implemented as an independent file server. The data collection module 210 may collect user log data through various smart electronic devices 300 connected to a domain providing a speech recognition service. The user log data may include regional dialect speech data.

Then, the regional dialect phoneme adaptive training system 200 transcribes speech data into text data using the data transcription module 220 (S120). The regional dialect phoneme adaptive training system 200 may generate regional dialect-containing transcription data by adding text in a regional dialect, transcribed from regional dialect-containing speech data, to existing transcription data not containing regional dialect speech.

S120 includes removing an abnormal vocalization (S121), measuring a degree of reliability of the speech data (S122), analyzing an accent of the speech data (S123), and transcribing the speech data (S124).

The regional dialect phoneme adaptive training system 200 may distinguish between normal speech and regional dialect speech through a reliability measurement of speech data in order to extract dialect transcription data from the user log data. Here, a degree of reliability is a concept including a recognition rate, and a recognition rate of regional dialect-containing speech may be distributed low as compared with a standard dialect. In this case, in addition to dialect sorting by a reliability measurement, through analysis of a unique regional dialect accent, a dialect may be sorted with high accuracy from standard dialect speech.

Thereafter, the regional dialect phoneme adaptive training system 200 analyzes and refines regional dialect-containing speech data using the corpus generation module 230, and generates a corpus as a result of analysis and refinement (S130).

S130 includes extracting features of a regional dialect item (S131), performing clustering of similar regional dialect items (S132), extracting a core regional dialect item from a cluster (S133), and standardizing a regional dialect corpus (S134).

Features of a regional dialect item may include pronunciation string features, lexical features (that is, morpheme/part of speech/embedding features), domain features, and frequency features. The pronunciation string features refer to acoustic features of phonemes and syllables constituting a regional dialect sentence. The lexical features (that is, morpheme/part of speech/embedding features) refer to linguistic features of morphemes, parts of speech, and embedding features, constituting a regional dialect sentence. The domain features include information on a type of an electronic device 300 used by a user, information on a region in which the electronic device 300 is located, and information on an age group of the user of the electronic device 300. The information on an age group of the user may be collected through user registration of a user purchasing the electronic device 300. Since regional dialect speech may be realized differently for different age groups, it is necessary to collect dialect speech according to user age group.

Figure 7:
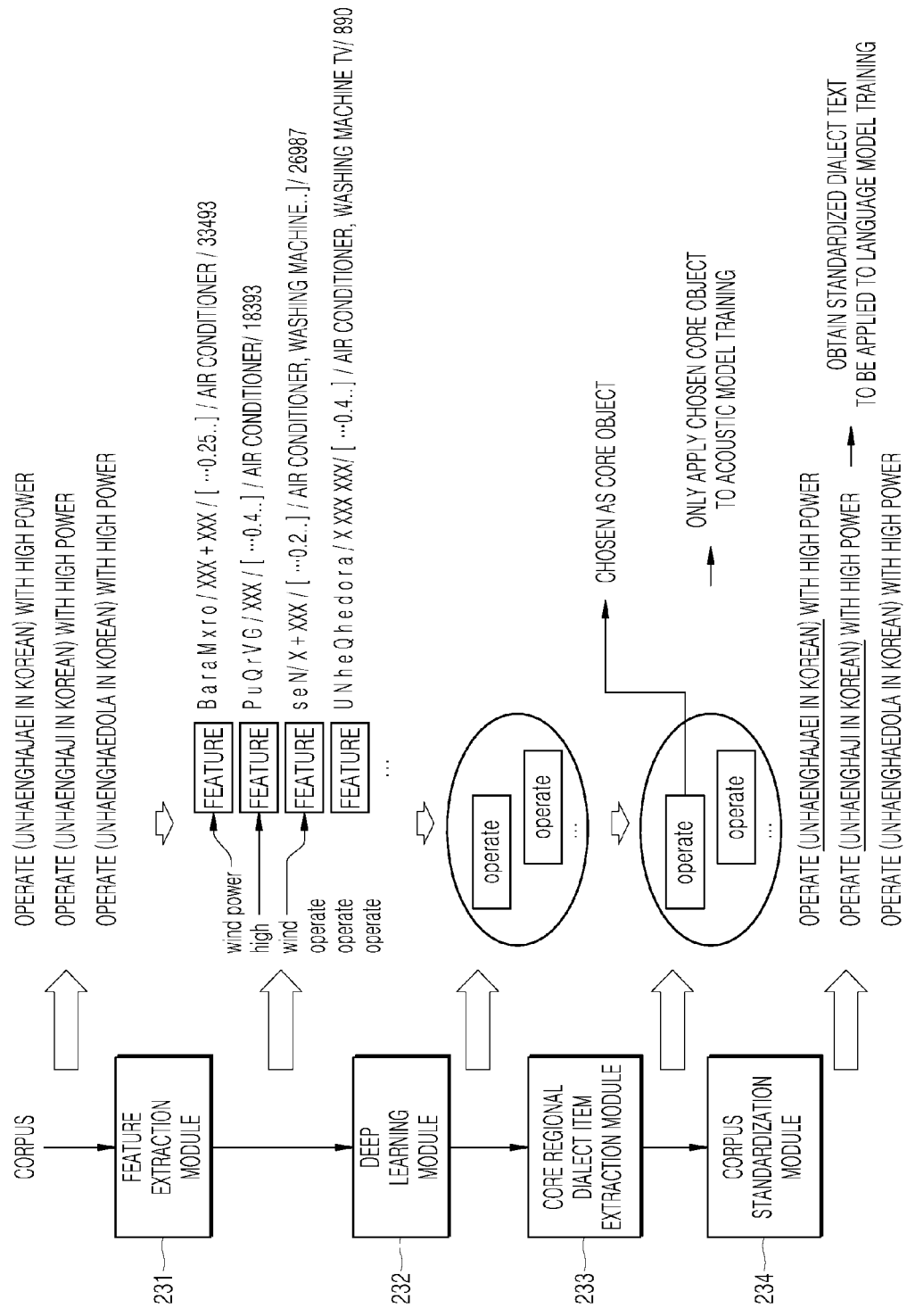
FIG. 7 is a view illustrating an example of analyzing and refining of data performed by a corpus generation module according to an embodiment of the present disclosure.

FIG. 7 is a view illustrating an example of data analysis and refinement, performed by a corpus generation module according to an embodiment of the present disclosure.

Referring to FIG. 7, an example of S131 to S134 (of FIG. 6) for data analysis and refinement, among operations constituting a regional dialect phoneme adaptive training method (S100) according to an embodiment of the present disclosure, is illustrated. As regional dialect sentences used for analysis and refinement of speech data, having the same meaning but different forms, a first sentence "Operate (unhaenghajaei in Korean) with high power", a second sentence "Operate (unhaenghaji in Korean) with high power", and a third sentence "Operate (unhaenghaedola in Korean) with high power" are selected as example sentences.

A feature extraction module 231 extracts features with respect to pronunciation string features, lexical features, domain features, and frequency features of each of the first sentence to the third sentence (S131). As examples of the domain features, a domain such as an air conditioner or a washing machine is illustrated.

Thereafter, a deep learning module 232 performs similar regional dialect item clustering using an unsupervised method (S132). In the regional dialect sentences, a clustering result for the predicates thereof is illustrated. In the first sentence to the third sentence, 'unhaenghajaei' and 'unhaenghaji' are clustered together, while 'unhaenghaedola' is not included in the same cluster.

Then, a core regional dialect item extraction module 233 extracts regional dialect speech items with high frequency features, and extracts a core regional dialect item through a similarity calculation (S133). Between the predicate of the first sentence and the predicate of the second sentence, 'unhaenghajaei' has higher frequency features compared to 'unhaenghaji'. Through the similarity calculation, 'unhaenghajaei' is chosen as a core object.

Then, a corpus standardization module 234 replaces an existing regional dialect item with a core object regional dialect item, and verifies corpus standardization through a similarity measurement between the original dialect sentence and the replaced sentence (S134). Of the first to third sentences, the predicate of the second sentence, 'unhaenghaji' is replaced with the core object, 'unhaenghajaei'.

Then, the regional dialect phoneme adaptive training system 200 generates a phoneme adaptive model 120 and a language model 140 through an acoustic model generation module 240 and a language model generation module 250, respectively, and trains the phoneme adaptive model 120 and the language model 140 using the regional dialect corpus generated in S134 (S140).

S140 includes an acoustic model training process and a language model training process. The acoustic model training process includes extracting phonemes of a regional dialect item (S141), extracting a frequency of the extracted regional phonemes (S142), and performing regional dialect phoneme adaptive training using the extracted phonemes and the extracted frequency (S143). The language model training process includes extracting a frequency of segmented word-phrase units (S144), and training the language model 140 using the segmented word-phrases and the frequency of the segmented word-phrases (S145).

Figure 8:
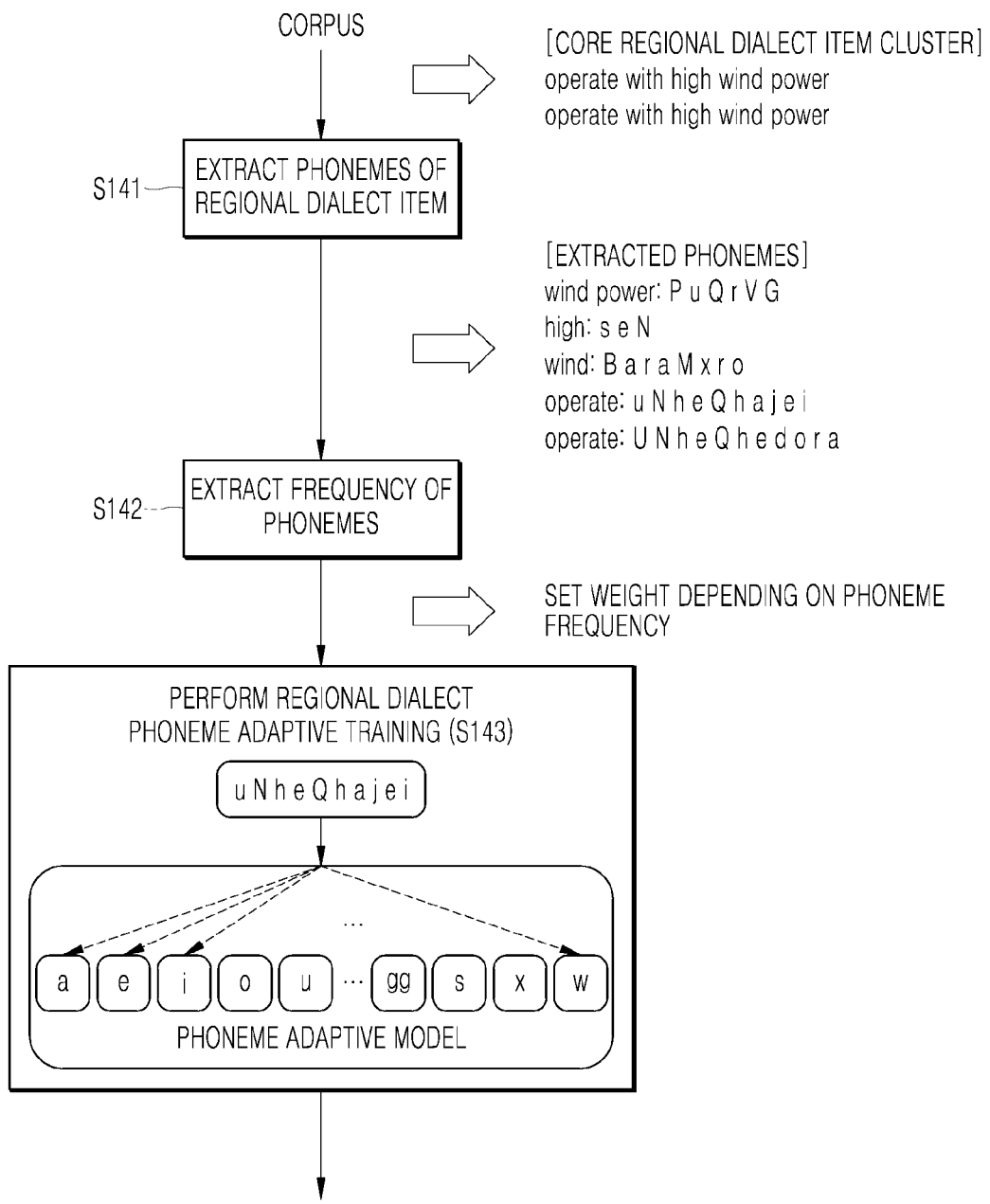
FIG. 8 is a view illustrating an example of a training method performed by a phoneme adaptive model generation module according to an embodiment of the present disclosure.

FIG. 8 is a view illustrating an example of a training method performed by a phoneme adaptive model generation module according to an embodiment of the present disclosure.

Referring to FIG. 8, a process of training a phoneme adaptive model using corpus data, performed by an acoustic model generation module 240, is illustrated.

A phoneme is the smallest unit of the phonology of a language, and one or more phonemes together form a syllable. The reason for extracting phonemes from regional dialect speech is that, in many cases, a regional dialect sentence includes phonemes frequently used according to region. For example, in a regional dialect sentence, phonemes forming a suffix which uniformly closes an end of a predicate, and a fortis or diphthong phoneme, may be used frequently.

The acoustic model generation module 240 extracts phonemes of a regional dialect item from speech data included in a corpus (S141). When a core regional dialect item cluster has been formed, the acoustic model generation module 240 may extract phonemes from a core regional dialect item as a target. For example, phonemes of word-phrases forming two regional dialect sentences of 'operate (unhaenghajaei in Korean) with high power' and 'operate (unhaenghaedola in Korean) with high power', that is, the phonemes forming the word-phrases of 'operate' (unhaenghajaei), 'operate' (unhaenghaedola), 'with', 'high', and 'power', may be extracted.

Then, the acoustic model generation module 240 extracts a frequency of the phonemes (S142). According to the frequency of a phoneme, a weight is set in a training process. Thus, as the frequency of the phoneme is higher, a larger weight is applied, and thus high-intensity learning may be provided. In this case, the ability of the acoustic model 120 to recognize phonemes of regional dialect speech may be improved through training the acoustic model 120 to adapt to phonemes of regional dialect items. In this regard, the acoustic model 120 according to an embodiment of the present disclosure may be referred to as a phoneme adaptive model.

Here, the frequency of a phoneme of a regional dialect item acts as a weight in an artificial neural network structure of a training process using an artificial intelligence algorithm, for example, deep learning.

Referring back to FIG. 6, for training the acoustic model 120 and the language model 140, a pronunciation dictionary 130 may also be used. The pronunciation dictionary 130 is composed of morphemes and phonemes representing pronunciation of the morphemes, and may be configured to include information on pronunciation of regional dialect items. Through the training, the performance of the acoustic model and the language model for standard dialect and regional dialect is improved.

Finally, the regional dialect phoneme adaptive training system 200 estimates the performance of the trained phoneme adaptive model 120 and the trained language model 140, through a performance estimation module 260 (S150).

S150 includes measuring a degree of reliability with respect to at least one model (S151), estimating a recognition performance using the degree of reliability (S152), comparing recognition performances between a plurality of models (S153), and confirming whether a recognition performance is improved by comparing a model with a better recognition performance, among the plurality of models, with a previous model (S154), internally. S150 may be performed on the acoustic model and the language model. S150 may be performed on each of the phoneme adaptive model 120 and the language model 140.

If the entire lexicon of a regional dialect, in which various forms are derived by various variations, is provided as a speech recognition target, a recognition rate may decrease, and a regional dialect speech recognition speed may decrease. Thus, through standardization of a regional dialect corpus, both a recognition rate and a recognition speed of regional dialect speech increases.

Moreover, a structure of word spacing, occurring in a regional dialect, is distinguished from word spacing of a standard dialect. Thus, when speech recognition is performed using a language model trained for word spacing of a regional dialect itself, a recognition rate of the regional dialect may be improved.

In addition, regarding learning of an acoustic model used in a pattern recognition operation of speech recognition, when learning is performed, in which a weight is applied according to frequency to a phoneme with a high frequency in a regional dialect sentence, the pattern recognition of regional dialect speech using an acoustic model may be performed at higher accuracy and speed.

As described above, according to embodiments of the present disclosure, by phonologically processing regional dialect speech through phoneme adaptive training using phonemes included in regional dialect items, a recognition rate of the regional dialect speech may be improved.

In addition, by enabling regional dialect-containing speech to be recognized as it is, without conversion into a standard dialect, natural language processing of language using a regional dialect may be performed.

In addition, by using artificial intelligence for data mining, data refining may be performed using a semi-automatic method.

In addition, through standardization of a corpus including regional dialect speech, the time consumed in regional dialect speech recognition may be reduced.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

The present disclosure is not limited to the example embodiments described above, and rather intended to include the following appended claims, and all modifications, equivalents, and alternatives falling within the spirit and scope of the following claims.

What is claimed is:

1. A regional dialect phoneme adaptive training method, performed by a regional dialect phoneme adaptive training system, the regional dialect phoneme adaptive training method comprising:
   transcribing text data by sorting regional dialect-containing speech data from collected speech data;
   generating a regional dialect corpus using the text data and the regional dialect-containing speech data; and
   generating an acoustic model and a language model using the regional dialect corpus,
   wherein the generating an acoustic model and a language model comprises extracting phonemes of a regional dialect item and a frequency of each of the phonemes of the regional dialect item, and training a phoneme adaptive model based on the extracted phonemes and the extracted frequencies, and
   wherein the generating a regional dialect corpus comprises:
   extracting a feature from the regional dialect-containing speech data;

performing clustering of similar regional dialect items in the regional dialect-containing speech data using the extracted feature;

extracting a core regional dialect item from a similar regional dialect item cluster; and standardizing a regional dialect corpus using the extracted core regional dialect item.

2. The regional dialect phoneme adaptive training method of claim 1, further comprising collecting speech data through a speech recognition service domain.

3. The regional dialect phoneme adaptive training method of claim 2, wherein, in the collecting speech data, speech data of users using different regional dialects is collected through speech input/output interfaces of various electronic devices.

4. The regional dialect phoneme adaptive training method of claim 1, wherein the transcribing text data comprises:

removing an abnormal vocalization from the collected speech data;

selecting regional dialect-containing speech data using a reliability measurement of the speech data; and obtaining transcription data from the regional dialect-containing speech data.

5. The regional dialect phoneme adaptive training method of claim 1, wherein, in the extracting a feature from the regional dialect-containing speech data, at least one among pronunciation string features, lexical features, domain features, and frequency features of a regional dialect item is extracted.

6. The regional dialect phoneme adaptive training method of claim 5, wherein the domain features comprise information on a type of an electronic apparatus providing a speech recognition service for the user, information on a region in which the electronic apparatus is located, and information on an age group of the user of the electronic apparatus.

7. The regional dialect phoneme adaptive training method of claim 1, wherein, in the performing clustering of similar regional dialect items, a degree of similarity between features is measured through a weight calculation between the features according to an unsupervised learning method, and regional dialect items having a degree of similarity higher than a threshold are clustered.

8. The regional dialect phoneme adaptive training method of claim 1, wherein, in the extracting a core regional dialect item from the similar regional dialect item cluster, N number of objects having the highest frequency features in a cluster are extracted, and a core object is extracted through a feature similarity calculation with other objects in the cluster.

9. The regional dialect phoneme adaptive training method of claim 1, wherein, in the standardizing a regional dialect corpus, an existing regional dialect item is replaced with a core object regional dialect item, and verification is performed through a similarity measurement between an original regional dialect sentence and a replaced sentence.

10. A regional dialect phoneme adaptive training system, comprising a computer processor configured to implement:

a data transcription module transcribing text data from regional dialect-containing speech data of collected speech data;

a corpus generation module generating a regional dialect corpus using the text data and the regional dialect-containing speech data;

an acoustic model generation module and a language model generation module generating an acoustic model and a language model, respectively, using the regional dialect corpus; and a speech recognition engine recognizing speech using the trained acoustic model and the trained language model, wherein the acoustic model generation module extracts phonemes of a regional dialect item and a frequency of each of the phonemes of the regional dialect item, and trains a phoneme adaptive model based on the extracted phonemes and the extracted frequency, wherein the processor is further configured to implement the corpus generation module to comprise:

a feature extraction module extracting a feature from the regional dialect-containing speech data;

a deep learning module performing clustering of similar regional dialect items in the regional dialect-containing speech data using the extracted feature;

a core regional dialect item extraction module extracting a core regional dialect item from a similar regional dialect item cluster; and a corpus standardization module standardizing a regional dialect corpus using the extracted core regional dialect item.

11. The regional dialect phoneme adaptive training system of claim 10, wherein the processor is further configured to implement the acoustic model generation module to comprise:

a first module extracting phonemes of a regional dialect item from regional dialect-containing speech data;

a second module extracting the frequency of each of the phonemes of the regional dialect item; and a third module training a phoneme adaptive model using the extracted phonemes and the extracted frequencies.

12. The regional dialect phoneme adaptive training system of claim 10, wherein the processor is further configured to implement a data collection module collecting speech data of users using different regional dialects through speech input/output interfaces of various electronic devices.

13. The regional dialect phoneme adaptive training system of claim 10, wherein the data transcription module removes an abnormal vocalization from collected speech data, selects regional dialect-containing speech data using a reliability measurement of the speech data, and generates transcription data from the regional dialect-containing speech data.

14. The regional dialect phoneme adaptive training system of claim 10, wherein the feature extraction module extracts at least one among pronunciation string features, lexical features, domain features, and frequency features of a regional dialect item.

15. The regional dialect phoneme adaptive training system of claim 14, wherein the domain features comprise information on a type of an electronic apparatus providing a speech recognition service for the user, information on a region in which the electronic apparatus is located, and information on an age group of the user of the electronic apparatus.

16. The regional dialect phoneme adaptive training system of claim 10, wherein the deep learning module measures a degree of similarity between features through a weight calculation between the features according to an unsupervised learning method, and clusters regional dialect items having a degree of similarity higher than a threshold.

17. The regional dialect phoneme adaptive training system of claim 10, wherein the core regional dialect item extraction module extracts N number of objects having the highest frequency features in a cluster, and extracts a core object through a feature similarity calculation with other objects in the cluster.

18. The regional dialect phoneme adaptive training system of claim 10, wherein the corpus standardization module replaces an existing regional dialect item with a core regional dialect item, and performs verification through a similarity measurement between an original regional dialect sentence and a replaced sentence.

\* \* \* \* \*